(12) United States Patent
Clima et al.

(10) Patent No.: US 8,817,716 B2
(45) Date of Patent: Aug. 26, 2014

(54) EFFICIENT WORKING STANDBY RADIO PROTECTION SCHEME

(75) Inventors: Laura Clima, Milan (IT); Giulio Monguzzi, Monza (IT); Per-Arne Thorsén, Öjersjö (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 150 days.

(21) Appl. No.: 13/061,230

(22) PCT Filed: Aug. 29, 2008

(86) PCT No.: PCT/EP2008/061425
§ 371 (c)(1),
(2), (4) Date: Feb. 28, 2011

(87) PCT Pub. No.: WO2010/022792
PCT Pub. Date: Mar. 4, 2010

(65) Prior Publication Data
US 2011/0149900 A1    Jun. 23, 2011

(51) Int. Cl.
| | |
|---|---|
| H04W 72/04 | (2009.01) |
| H04W 72/10 | (2009.01) |
| H04L 5/00 | (2006.01) |
| H04L 1/00 | (2006.01) |
| H04B 1/74 | (2006.01) |
| H04B 10/032 | (2013.01) |
| H04W 56/00 | (2009.01) |
| H04W 72/12 | (2009.01) |
| H04L 12/56 | (2006.01) |

(52) U.S. Cl.
CPC .............. H04W 72/10 (2013.01); H04L 5/0001 (2013.01); H04L 1/0084 (2013.01); H04B 1/74 (2013.01); H04B 10/032 (2013.01); H04W 72/1263 (2013.01); H04L 1/0011 (2013.01); H04L 49/552 (2013.01)

USPC ........ 370/329; 370/437; 455/450; 455/452.1; 455/512

(58) Field of Classification Search
None
See application file for complete search history.

(56) References Cited

U.S. PATENT DOCUMENTS

| 5,155,483 A | 10/1992 | Morimoto |
| 5,299,198 A | 3/1994 | Kay |

(Continued)

FOREIGN PATENT DOCUMENTS

| GB | 2 262 863 | 6/1993 |
| WO | WO 2007/024110 | 3/2007 |

OTHER PUBLICATIONS

Tarhini et al ("On capacity of OFDMA-based IEEE 802.16 WiMAX including Adaptive Modulation and Coding (AMC) and inter-cell interference", IEEE Workshop on Local and Metropolitan Area Networks, Proceedings, Jun. 2007).*

Peng, et al: "Study on QoS Mechanisms in WiMAX Systems". Telecommunication Engineering School, Beijing University of Posts and Telecommunications. vol. 11, No. 2. Apr. 2005.

(Continued)

*Primary Examiner* — Hanh N Nguyen
*Assistant Examiner* — Joshua A Kading (57) ABSTRACT

A radio link transmission method that comprises transmitting data on a plurality of radio channels. The method allocates a portion of the capacity of each radio channel for transmission of identical data on the plurality of radio channels. The remaining capacity of each radio channel is allocated for transmission of unique data, which is different for each radio channel. The method further transmits the identical data on each radio channel of the plurality of radio channels, and transmits the unique data in the respective radio channels of the plurality of radio channels.

22 Claims, 7 Drawing Sheets

(56) References Cited

U.S. PATENT DOCUMENTS

| | | | |
|---|---|---|---|
| 2004/0057430 A1* | 3/2004 | Paavolainen | 370/390 |
| 2005/0100039 A1 | 5/2005 | Husted et al. | |
| 2006/0013210 A1* | 1/2006 | Bordogna et al. | 370/389 |
| 2008/0080364 A1* | 4/2008 | Barak et al. | 370/210 |
| 2008/0130612 A1 | 6/2008 | Gorokhov | |

OTHER PUBLICATIONS

Tarhini, et al: "On capacity of OFDMA-based IEEE802.16 WiMAX including Adaptive Modulation and Coding (AMC) and inter-cell interference". Proceedings of the 2007 15$^{th}$ IEEE Workshop on Local and Metropolitan Area Networks.

* cited by examiner

|  |  | CAPACITY (Mbps) | HOP 2 | | | |
|---|---|---|---|---|---|---|
|  |  |  | 4 QAM | 16 QAM | 64 QAM | 128 QAM |
| HOP 1 | 4 QAM | Protected circuit-switched traffic | 16 | 16 | 16 | 16 |
|  |  | Protected packet traffic | 12 | 12 | 12 | 12 |
|  |  | Guaranteed packet traffic (1,2) | 20+20 | 20+20 | 20+20 | 20+20 |
|  |  | Best effort packet traffic (1,2) | 0+0 | 0+48 | 0+92 | 0+112 |
|  | 16 QAM | Protected circuit-switched traffic | 16 | 16 | 16 | 16 |
|  |  | Protected packet traffic | 12 | 12 | 12 | 12 |
|  |  | Guaranteed packet traffic (1,2) | 20+20 | 20+20 | 20+20 | 20+20 |
|  |  | Best effort packet traffic (1,2) | 48+0 | 48+48 | 48+92 | 48+112 |
|  | 64 QAM | Protected circuit-switched traffic | 16 | 16 | 16 | 16 |
|  |  | Protected packet traffic | 12 | 12 | 12 | 12 |
|  |  | Guaranteed packet traffic (1,2) | 20+20 | 20+20 | 20+20 | 20+20 |
|  |  | Best effort packet traffic (1,2) | 92+0 | 92+48 | 92+92 | 92+112 |
|  | 128 QAM | Protected circuit-switched traffic | 16 | 16 | 16 | 16 |
|  |  | Protected packet traffic | 12 | 12 | 12 | 12 |
|  |  | Guaranteed packet traffic (1,2) | 20+20 | 20+20 | 20+20 | 20+20 |
|  |  | Best effort packet traffic (1,2) | 112+0 | 112+48 | 112+92 | 112+112 |

EFFICIENT WORKING STANDBY RADIO PROTECTION SCHEME

TECHNICAL FIELD

The present invention relates to communication systems, in particular to wireless systems adopting radio protection schemes.

BACKGROUND

Wireless backhaul has recently been growing in popularity with both fixed and mobile carriers, which ask for support of different classes of services for both real-time applications, such as voice, and non real-time applications, such as web browsing and video streaming. The former services require high levels of availability, while lower levels are envisaged for the latter.

In order to guarantee a certain degree of QoS and a certain level of service availability, wireless systems normally use some sort of radio protection scheme: the most commonly used radio protection is based on the principle of duplicating the radio link, and carrying the same traffic on both hops.

Figure 1:
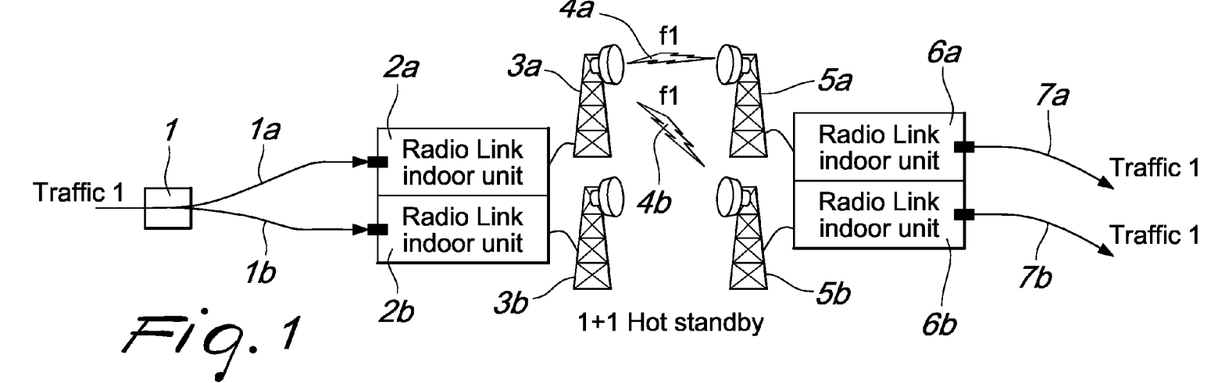
FIG. 1 shows a known 1+1 hot standby protection scheme.

The two most common configurations for radio protection are 1+1 hot standby and 1+1 working standby:

Hot standby configuration is shown in FIG. 1 and consists of two transmitters 3a-3b and two receivers 5a-5b, tuned on the same frequency f1. Traffic 1 is split in two identical flows 1a and 1b and sent to two radio link indoor units 2a and 2b, and from there to the two transmitters 3a and 3b; only transmitter 3a is active, while transmitter 3b is in standby. Transmitter 3a sends the same data to receivers 5a and 5b, over the two channels 4a and 4b. Data is collected by two further radio link indoor units 6a and 6b, so that the resulting two traffic flows 7a and 7b are the same. The transmitter 3b transmits only if the transmitter 3a or the radio link indoor unit 2a experience problems.

Figure 2:
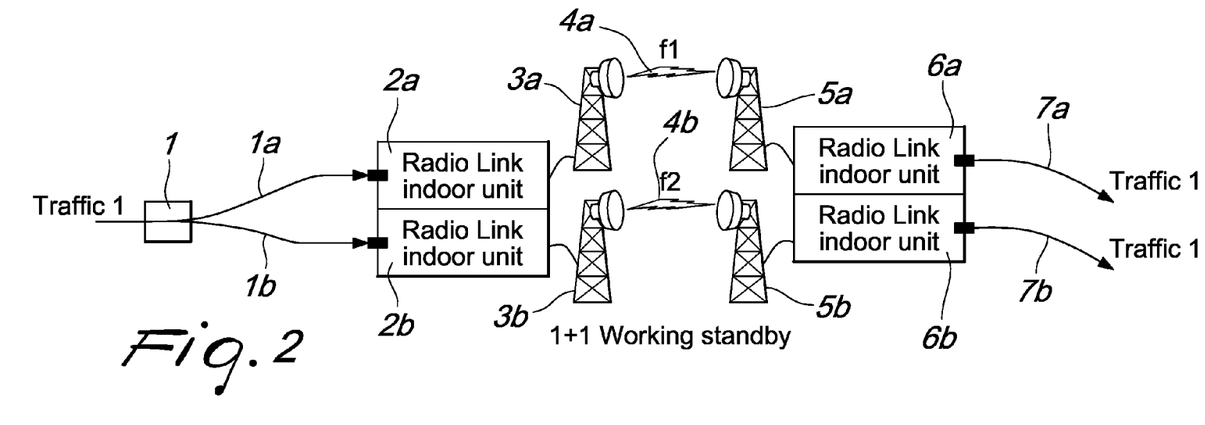
FIG. 2 shows a known 1+1 working standby protection scheme.

In working standby configuration there are still two transmitters and two receivers, but they are tuned on different frequencies; the traffic is duplicated and both transmitters are active in parallel, sending the same data. FIG. 2 shows the most commonly implemented 1+1 working standby scenario: the traffic 1, split in two identical flows 1a and 1b, is sent to the transmitters 3a and 3b via the radio link indoor units 2a and 2b. Both transmitters are active and tuned on a different frequency f1 and f2. The traffic is then sent both by transmitter 3a to receiver 5a via channel 4a, and by transmitter 3b to receiver 5b via channel 4b. The received data is collected by the two radio link indoor units 6a and 6b, so that the resulting two traffic flows 7a and 7b are the same.

Most commonly, with respect to the need for protection, four different traffic typologies can be identified: circuit-switched traffic (typically voice), protected packet traffic, guaranteed packet traffic, which besides guarantees a maximum limit on delay, and best effort packet traffic, which carries non critical services such as web traffic or file transfers, and for which the network does not provide any guarantee that the data is delivered.

In recent years the technology of Adaptive Modulation and Coding (AMC) has been developed with the aim of improving the channel bandwidth efficiency.

The basic idea behind AMC is that the modulation and coding scheme on the communication channels is not fixed statically, but can vary dynamically over time in response to the varying quality of the radio link.

The use of AMC in combination with protection allows for a more effective exploitation of the available bandwidth. At present two main schemes that build upon the 1+1 working standby configuration are known.

The first solution consists in transmitting the same radio frames with the most spectral efficient modulation scheme on both links of the 1+1 configuration. This strategy maximizes the throughput in spite of protection, as the chosen best modulation might be not in accordance with channel condition of both links.

The dual solution prefers the protection in spite of the throughput by transmitting the same radio frames with the lower modulation scheme between the two links.

Known protection schemes do not consider any difference in the type of data traffic transported, that is, they protect all traffic, even the traffic that does not require protection such as guaranteed and best effort data, and this results in ineffective bandwidth utilization.

SUMMARY

The aim of the present invention is to provide a new radio protection scheme that overcomes the above mentioned drawbacks, by guaranteeing high availability together with best efficiency in terms of available capacity in the radio channel.

This aim and other objects which will become better apparent hereinafter are achieved by a radio link transmission method comprising transmitting data on a plurality of radio channels. The method allocates a portion of the capacity of each radio channel for transmission of identical data on the plurality of radio channels. The remaining capacity of each radio channel is allocated for transmission of unique data, which is different for each radio channel. The method further transmits the identical data on each radio channel of the plurality of radio channels, and transmits the unique data in the respective radio channels of the plurality of radio channels.

The plurality of radio channels may be composed of two channels, which may optionally use different frequencies and/or use different polarizations.

The plurality of radio channels may be in the microwave band and may optionally have different capacities.

Furthermore, the plurality of radio channels may adopt different modulation schemes, and each radio channel may adopt a modulation scheme which changes over time.

The portion of each radio channel capacity allocated for transmission of identical data may be constant over time.

According to another aspect of the invention, a radio link transmission apparatus for transmitting data on a plurality of radio channels is provided. The apparatus comprises means for allocating a portion of the capacity of each radio channel of the plurality of channels for identical data and for allocating the remaining portion of the capacity for unique data.

The apparatus further comprises means for transmitting the identical data on each radio channel of the plurality of radio channels, and means for transmitting the unique data on each radio channel of the plurality of channels; the unique data are different for each radio channel of the plurality of radio channels.

The plurality of radio channels may be composed of two channels and may use different frequencies and/or different polarizations.

The radio channels may be in the microwave band and may have different capacities.

The means for transmitting the identical data and the means for transmitting the unique data may comprise respective modulators configured to adopt modulation schemes different from one modulator to another.

The modulation scheme for each radio channel may be adaptive.

Optionally, the portion of each radio channel capacity allocated for transmission of identical data may be constant over time.

The means for transmitting identical data may comprise a splitter, having an input for receiving the identical data and a plurality of outputs for transmitting the identical data on all of the plurality of channels.

The means for allocating may comprise at least one multiplexer for each channel of the plurality of channels, which is configured to aggregate the identical data with the unique data of each channel.

The aim and the objects of the invention are also achieved by a radio link comprising the above radio link transmitting apparatus and a radio link receiving apparatus.

The radio link receiving apparatus may comprise means for separating the identical data from the unique data in each channel.

It is noted that the proposed configuration can be used for carrying both protected and unprotected traffics on the same radio link, in which only the traffic that need protection is duplicated, thus allowing to increase the total traffic capacity.

Moreover, adopting Adaptive Modulation and Coding allows to apply the most suitable AMC scheme independently on each link of the working standby configuration.

BRIEF DESCRIPTION OF THE DRAWINGS

Further characteristics and advantages of the invention will become better apparent from the detailed description of particular but not exclusive embodiments, illustrated by way of non-limiting examples in the accompanying drawings, wherein.

DETAILED DESCRIPTION

Figure 3:
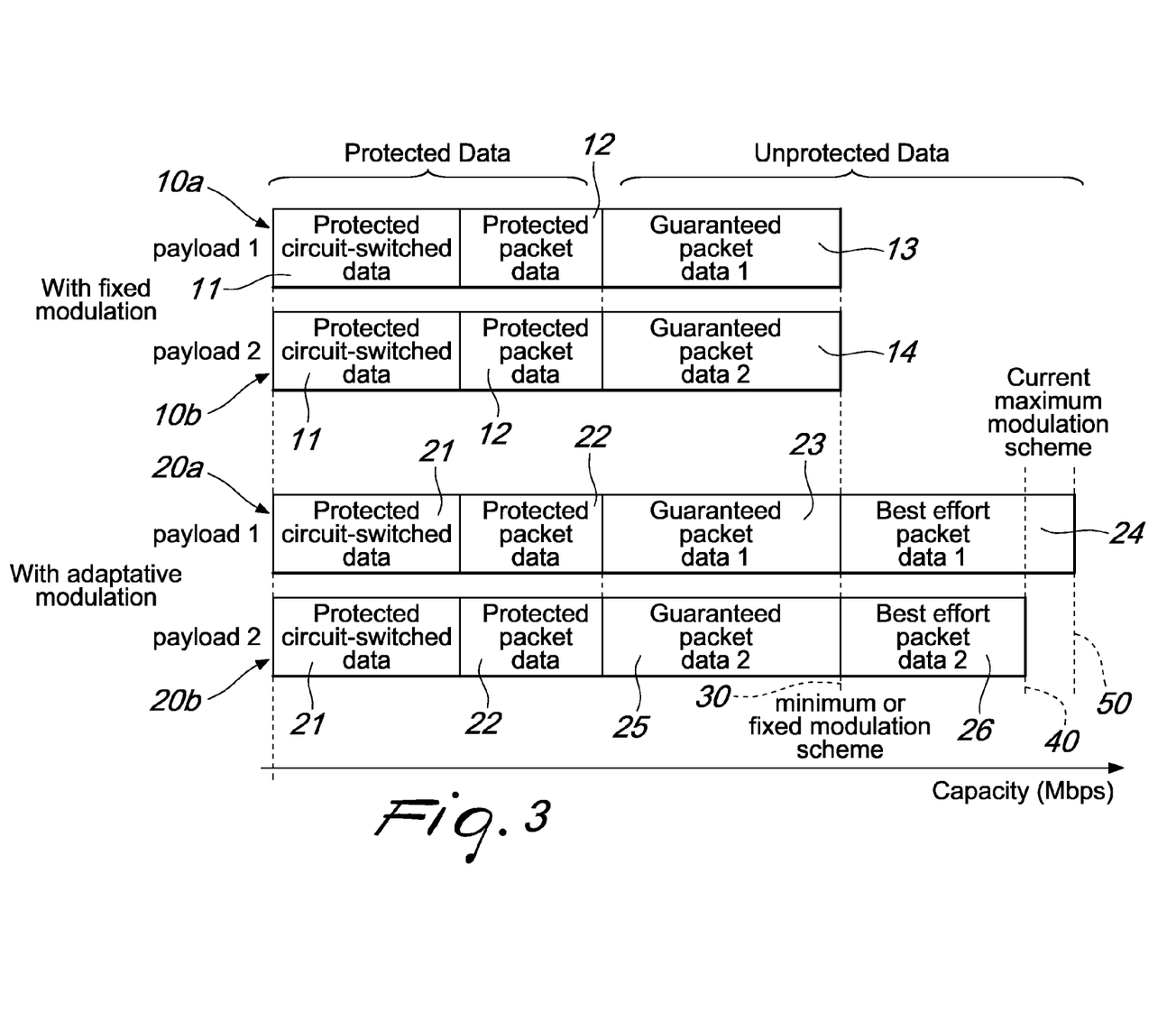
FIG. 3 represents the combination of different traffic typologies both in fixed and adaptive modulation scheme according to the present invention.

FIG. 3 shows the combination of different traffic typologies on the two channels of a working standby configuration according to the invention, both in a fixed modulation scheme and in an adaptive modulation scheme.

If the channels are in fixed scheme mode, the capacity, depicted by line 30, is constant, and the system carries three typologies of traffic: protected circuit-switched data, protected packet data and guaranteed packet data. The traffic is split in two payloads 10*a* and 10*b*, which respectively travel at the frequencies f1 and f2 of the 1+1 working standby configuration. Protected circuit-switched data 11 and protected packet data 12 are duplicated in the two payloads and then protected. On the contrary, different guaranteed packet data 13 and 14 are respectively carried by the two payloads 10*a* and 10*b*, and then they are unprotected and guaranteed with an availability level dependent on the quality level of the modulation scheme.

When adaptive modulation is utilized, the total capacity varies over time. In this case, an additional typology of traffic, best effort traffic, may be present in addition to the other typologies of traffic described above. As in the fixed modulation case, two payloads 20*a* and 20*b* flow at the respective frequencies f1 and f2 of the 1+1 working standby configuration.

Protected circuit-switched data 21 and protected packet data 22 are duplicated in the respective payloads 20*a* and 20*b*, while different unprotected data is sent in payloads 20*a* and 20*b*. In particular, payload 20*a* carries guaranteed packet data 23 and best effort packet data 24 which are different from the guaranteed packet data 25 and the best effort packet data 26 which are carried by the other payload 20*b*.

The total capacity allocated to protected traffic 21 and 22 is less or equal to the minimum modulation scheme capacity, indicated by line 30 in FIG. 3. The capacity allocated for guaranteed packed data 23 and 25 (if any) is determined by the difference between the minimum modulation capacity and the capacity configured for protected data. The available capacity for best effort data 24 and 26 is varying and depends on the actual modulation scheme: lines 40 and 50 in FIG. 3 depict the current maximum modulation scheme on the first and the second channel f1 and f2. Best effort data is not only not duplicated and then not protected, but the quantity of data carried can vary in the two payloads reflecting the different conditions of the two radio channels.

A possible embodiment of the system needed to perform the aggregation and separation of the two traffic payloads is now discussed with reference to FIG. 4.

At the transmitter 100 of the radio link, a first multiplexer 110 is provided for aggregating the circuit-switched data and/or the protected packet data 101, which may be of the same or different rates, synchronous, plesiochronous or asynchronous, obtaining the protected composite data stream 102.

In order to simplify recovery of the individual data streams at the receiver side 200, a generator of synchronization information 120 may be further added to the composite data stream via the aggregator 130.

Figure 4:
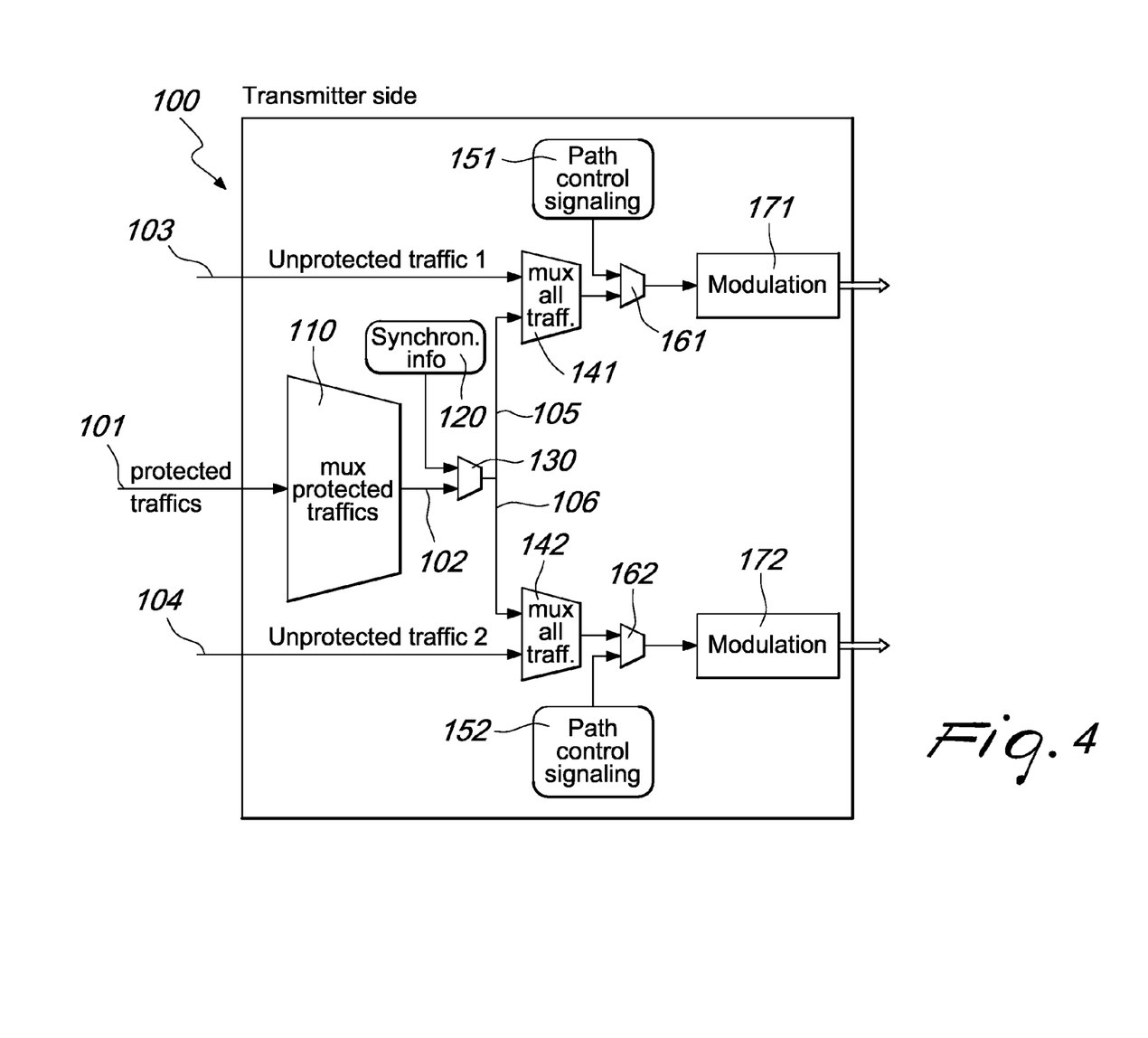
FIG. 4 shows a preferred embodiment of the transmitting system for combining protected and unprotected traffic according to the present invention.

The output of the first multiplexer or, as shown in FIG. 4, of the aggregator 130 is fed to two second multiplexers 141 and 142, so as to duplicate the protected composite data stream and to obtain two streams of identical data. The second multiplexers 141 and 142 also comprise at their inputs different unprotected traffic streams 103 and 104, respectively, which also may be of the same or different rates, synchronous, plesiochronous or asynchronous and which will be herein referred to also as unique data streams.

Each of the duplicated protected composite data streams 105 and 106 is then aggregated with different unique data streams 103 and 104, respectively.

Furthermore, respective generators of path specific control signaling 151 and 152 are provided in input to third multiplexers 161 and 162, which also receive the multiplexed traffic from the second multiplexers 141 and 142, respectively.

The outputs of the third multiplexers 161 and 162 which carry the resulting assembled composite data streams are fed to modulation devices 171 and 172, respectively, and finally to radio transmitters, not shown.

Figure 5:
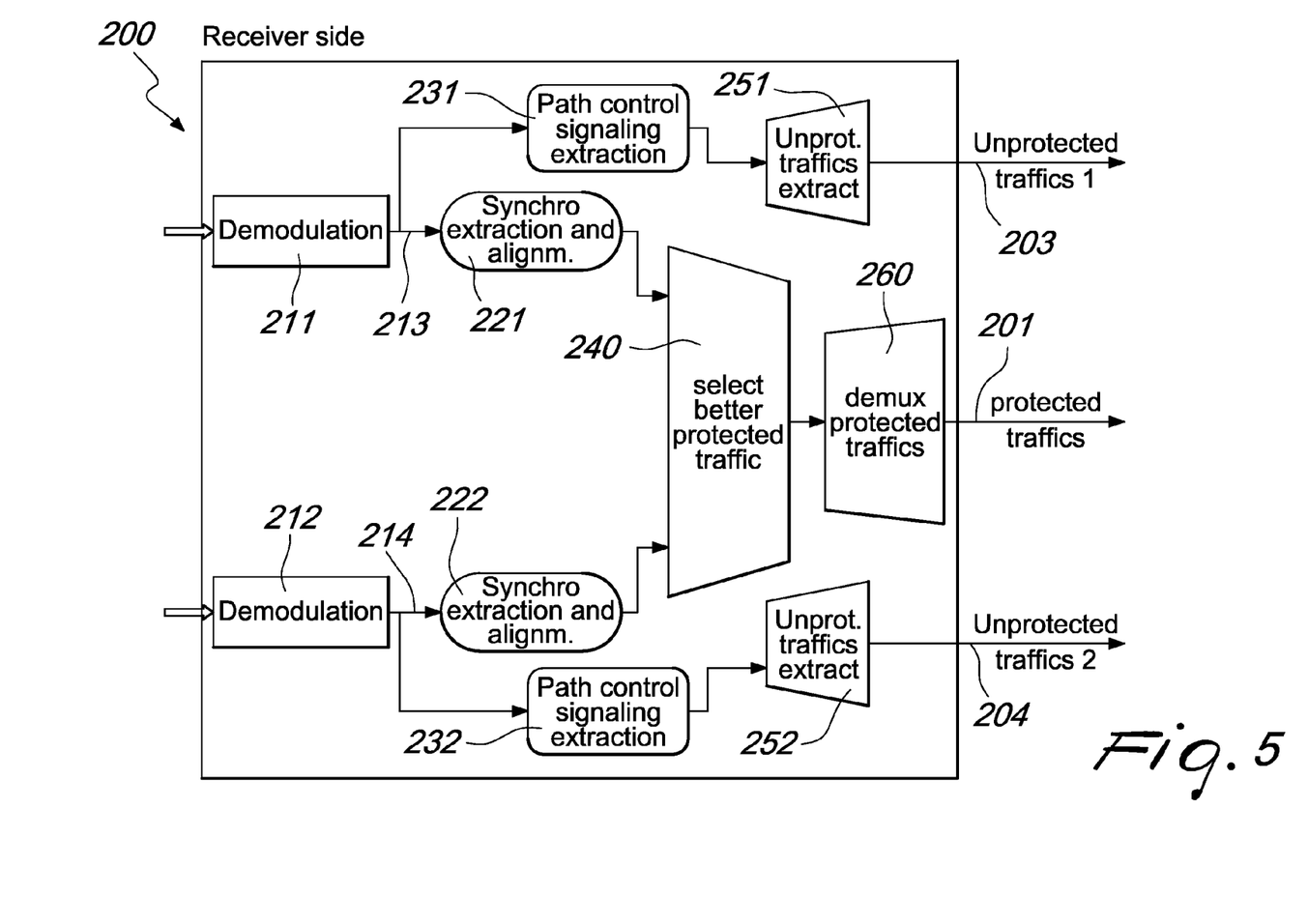
FIG. 5 shows a preferred embodiment of the receiving systems for recovering protected and unprotected traffic according to the present invention.

At the receiver 200 of the radio link, as shown in FIG. 5, demodulation devices 211 and 212 may be provided for each channel f1 and f2 to recover the composite data streams from the radio signals. Synchronization means 221 and 222 may be provided downstream of the demodulation devices 211 and 212 for carrying out extraction of synchronization information and alignment of the individual demodulated composite data streams 213 and 214, using the synchronization information added by the generator 120 in the transmitter 100.

A selector 240 is connected downstream of the synchronization means 221 and 222 for selecting the best protected traffic by using the quality of the transmission paths.

A first demultiplexer 260 is connected to the output of the selector 240 for extracting the protected data and obtaining the protected data traffics 201.

Analogously, path specific control signaling extraction devices 231 and 232 are provided for allowing composite data decoding. Second demultiplexers 251 and 252 are instead connected to the output of the path specific control signaling extraction devices 231 and 232 in order to extract unprotected data and obtain the unprotected data traffics 203 and 204. When synchronization or alignment is lost, only the unprotected data are extracted.

An embodiment of the invention in which adaptive modulation is adopted will be detailed through a practical example in which the radio link implementing the invention is configured as follows. The modulation schemes adopted in adaptive modulation are 4 QAM, 16 QAM, 64 QAM, and 128 QAM, the protected circuit-switched traffic capacity is 16 Mbps and the protected packet traffic capacity is 12 Mbps.

Considering that a plausible capacity of the most robust modulation scheme (4 QAM) can be 48 Mbps, the guaranteed packet traffic capacity results 48-16-12=20 Mbps.

Figure 6:
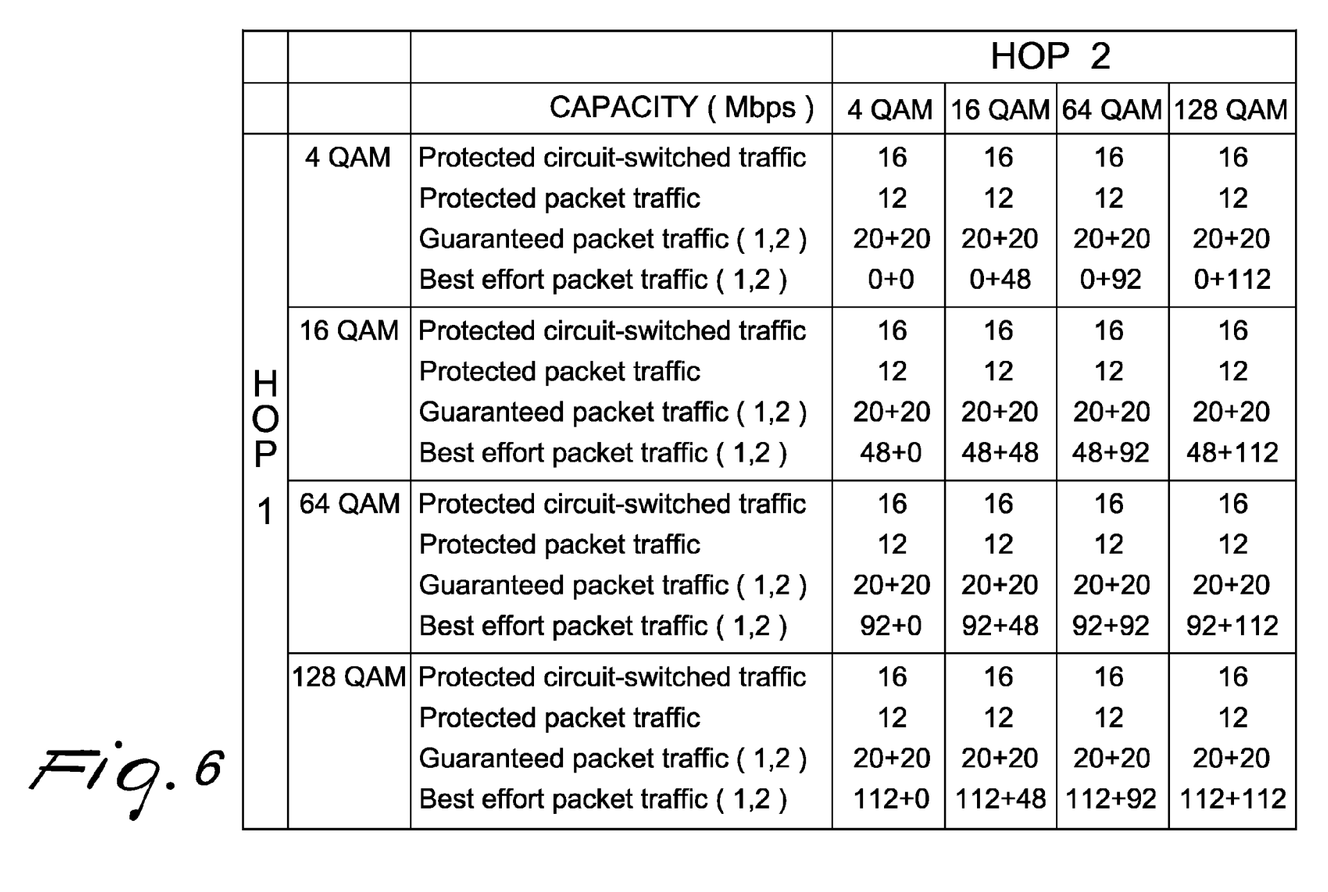
FIG. 6 shows the maximum available traffic capacity of the two radio links of the embodiment for each handled typology of traffic with reference to a practical example.

In FIG. 6, the maximum available traffic capacity of the two radio links of the embodiment are shown, for each handled typology of traffic.

Figure 7:
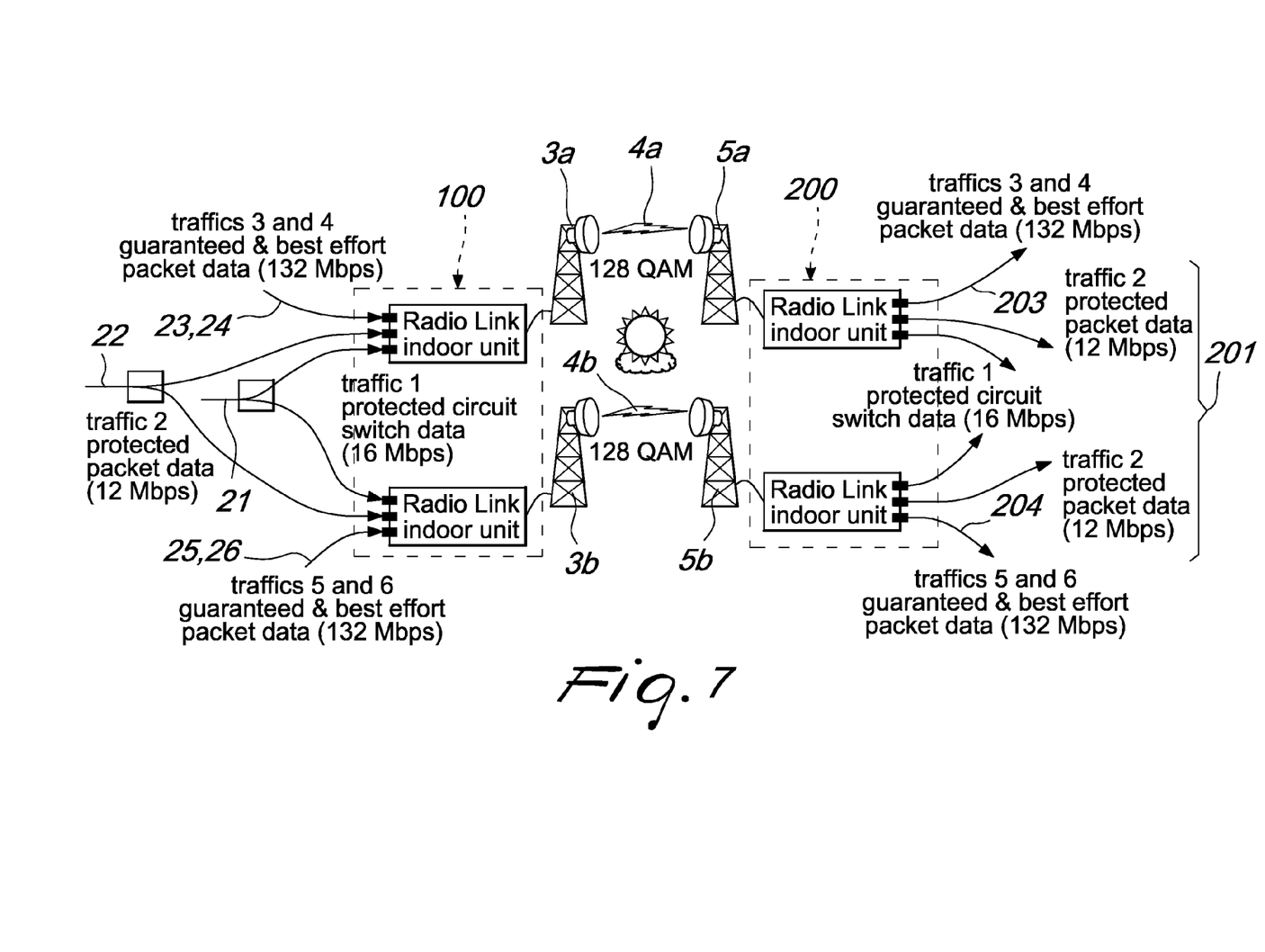
FIG. 7 shows a protection scheme according to the invention, when link conditions are favorable.

During period with favorable propagation conditions, shown in FIG. 7, the two radio links work at the highest modulation scheme, that is 128 QAM. According to the table of FIG. 6, the traffic capacities would be of 16 MBps for circuit switched data 21, 12 Mbps for protected packet data 22, 20 Mbps for guaranteed packet data 23 and 25, and 112 Mbps for best effort packet data 24 and 26.

Assuming that slight fading conditions affect the first radio link 4a, the modulation is adaptively changed to more robust scheme, 64 QAM. The traffic capacities will now remain unchanged for protected and guaranteed data, while best effort data in the first hop would decrement to 92 Mbps.

Figure 8:
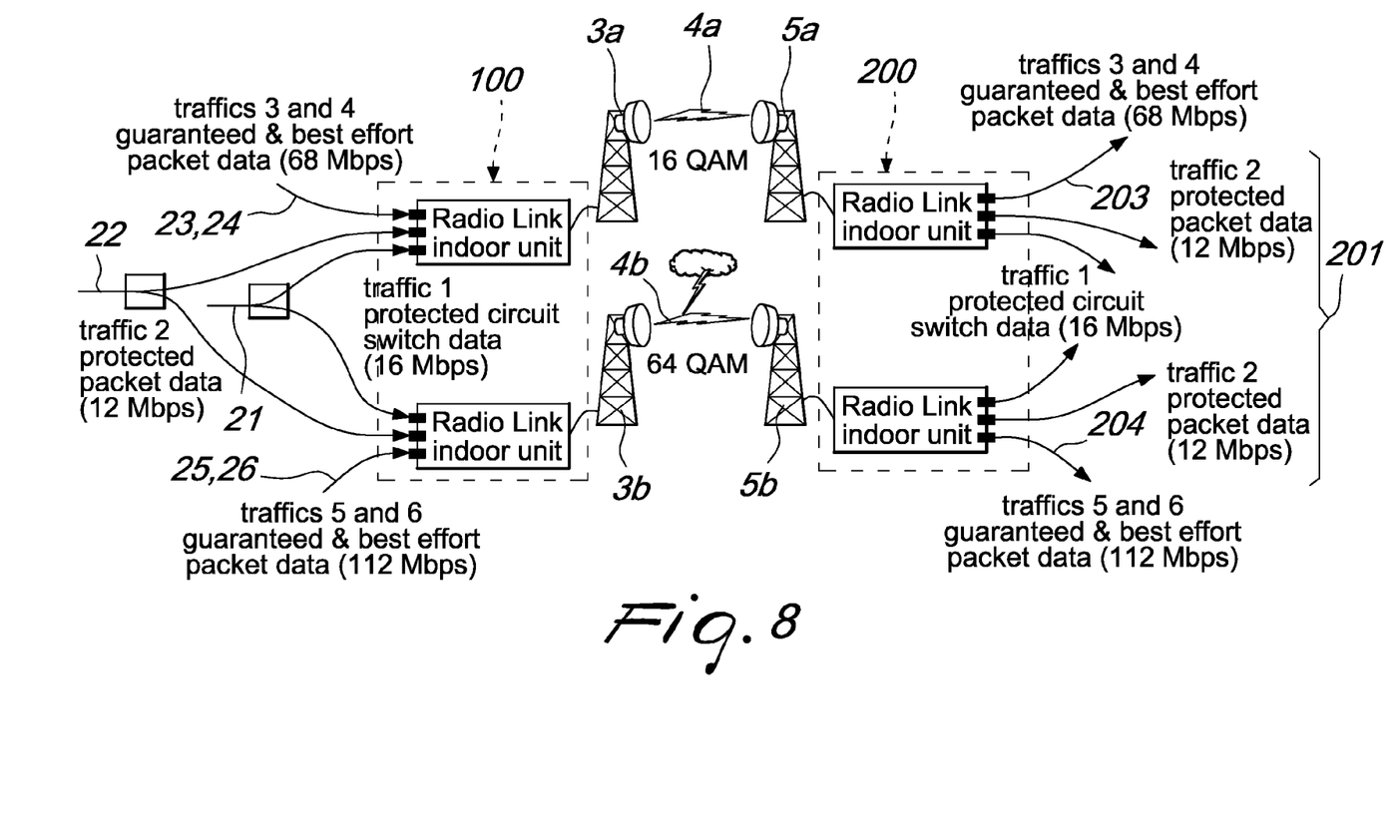
FIG. 8 shows a protection scheme according to the invention, when link conditions worsen.

When propagation conditions worsen and affect both radio links 4a and 4b, as shown in FIG. 8, their modulations are adaptively changed to more robust schemes, e.g. 16 QAM and 64 QAM, respectively. The traffic capacities will vary accordingly, diminishing the capacity for best effort data 24 and 26 on both hops respectively to 48 and 92 Mbps.

It has been shown that the invention fully achieves the intended aim and objects, since it allows to combine radio protection with efficient bandwidth utilization.

The invention advantageously supports different quality of service classes, and introduces no changes on protection of protected traffic, but doubles available capacity for unprotected traffic, so that unprotected data throughput is approximately doubled with respect to working standby protection offered by present state of the art.

Furthermore the invention allows to fully exploit the gain in bandwidth utilization obtained by the use of an Adaptive Modulation and Coding scheme, by suggesting that adaptive modulation functionality is independently applied on the two radio links of the working configuration. In this way, the optimal modulation is always selected on each radio link and the spectral efficiency of the single radio link resource is improved.

Besides the invention provides a simple and easy to implement solution, that does not require additional frequencies or supplementary equipment.

The invention also provides a hitless protection of circuit-switched data, and supports prioritization of packet data traffic, transport of guaranteed packet data and hitless protection of packet data.

Clearly, several modifications will be apparent to and can be readily made by the skilled in the art without departing from the scope of the present invention.

For example it is straightforward for the skilled in the art extending the described scheme to a scenario comprising more than two channels, or considering a system in which the differentiation of the two channels is performed on polarization instead of frequency.

Therefore, the scope of the claims shall not be limited by the illustrations or the preferred embodiments given in the description in the form of examples, but rather the claims shall encompass all of the features of patentable novelty that reside in the present invention, including all the features that would be treated as equivalents by the skilled in the art.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

The invention claimed is:

1. A radio link transmission method for transmitting data on a plurality of radio channels, comprising the steps of:
    allocating a portion of capacity of each radio channel of said plurality of radio channels for transmission of payloads of identical data on said plurality of radio channels, said payloads of identical data being separated into protected data;
    allocating remaining capacity of each radio channel of said plurality of radio channels for transmission of payloads of unique data, which is different for each radio channel of said plurality of radio channels, said payloads of unique data being separated into unprotected data;
    transmitting said payloads of identical data on each radio channel of said plurality of radio channels, so that said protected data are transmitted on each of said plurality of radio channels; and
    transmitting said payloads of unique data in respective radio channels of said plurality of radio channels, so that said unprotected data are different for each radio channel of said plurality of radio channels.

2. The method of claim 1, wherein said protected data belongs to a protected circuit switched data traffic typology and/or to a protected packet data traffic typology; and
    wherein said unprotected data belongs to a guaranteed packet data traffic typology and/or to a best effort packet data traffic typology.

3. The method of claim 1, wherein said plurality of radio channels comprises two channels.

4. The method of claim 1 wherein said plurality of radio channels use different frequencies.

5. The method of claim 1 wherein said plurality of radio channels use different polarizations.

6. The method of claim 1, wherein said plurality of radio channels are in a microwave band.

7. The method of claim 1, wherein said plurality of radio channels have different capacities.

8. The method of claim 1, wherein said plurality of radio channels adopt different modulation schemes.

9. The method of claim 1, further comprising adopting a modulation scheme for each radio channel which changes over time.

10. The method of claim 1, wherein said portion of said capacity of each radio channel allocated for transmission of said payloads of identical data does not change over time.

11. A radio link transmission apparatus for transmitting data on a plurality of radio channels, comprising:
- means for allocating a portion of capacity of each radio channel of said plurality of channels for payloads of identical data and for allocating remaining portion of the capacity for payloads of unique data, said payloads of identical data being separated into protected data and said payloads of unique data being separated into unprotected data;
- means for transmitting said payloads of identical data on each radio channel of said plurality of radio channels, so that said protected data are transmitted on each of said plurality of radio channels; and
- means for transmitting said payloads of unique data in respective radio channels of said plurality of channels, so that said unprotected data are different for each radio channel of said plurality of radio channels.

12. The apparatus of claim 11, wherein said protected data belongs to a protected circuit switched data traffic typology and/or to a protected packet data traffic typology; and
- wherein said unprotected data belongs to a guaranteed packet data traffic typology and/or to a best effort packet data traffic typology.

13. The apparatus of claim 11, wherein said plurality of radio channels comprises two channels.

14. The apparatus of claim 11 wherein said plurality of radio channels use different frequencies.

15. The apparatus of claim 11 wherein said plurality of radio channels use different polarizations.

16. The apparatus of claim 11, wherein said plurality of radio channels are in a microwave band.

17. The apparatus of claim 11, wherein said plurality of radio channels have different capacities.

18. The apparatus of claim 11, wherein said means for transmitting said payloads of identical data and said means for transmitting said payloads of unique data comprise respective modulators configured to adopt modulation schemes different from one modulator to another.

19. The apparatus of claim 18, wherein said modulation scheme for each radio channel is adaptive.

20. The apparatus of claim 11, wherein said portion of said capacity of each radio channel allocated for transmission of said payloads of identical data does not change over time.

21. The apparatus of claim 11, wherein said means for transmitting said payloads of identical data comprise a splitter having an input for receiving said payloads of identical data and a plurality of outputs for transmitting said payloads of identical data on all of said plurality of channels.

22. The apparatus of claim 11, wherein said means for allocating comprise at least one multiplexer for each channel of said plurality of channels, configured to aggregate said payloads of identical data with said payloads of unique data of said each channel.

\* \* \* \* \*